(12) United States Patent
Taylor (10) Patent No.: US 12,471,544 B2
(45) Date of Patent: Nov. 18, 2025

(54) PLANT WATERING CONTAINER (71) Applicant: Process4, Inc., Chagrin Falls, OH (US)

(72) Inventor: Curtis Taylor, Chagrin Falls, OH (US)

(73) Assignee: Process4, Inc., Chagrin Falls, OH (US)

( * ) Notice: Subject to any disclaimer, the term of this patent is extended or adjusted under 35 U.S.C. 154(b) by 146 days.

(21) Appl. No.: 18/076,799

(22) Filed: Dec. 7, 2022

(65) Prior Publication Data

US 2023/0172125 A1 Jun. 8, 2023

Related U.S. Application Data

(60) Provisional application No. 63/286,867, filed on Dec. 7, 2021.

(51) Int. Cl.
*A01G 25/14* (2006.01)

(52) U.S. Cl.
CPC .................................. *A01G 25/145* (2013.01)

(58) Field of Classification Search
CPC .................................................. A01G 25/145
USPC .................................. 222/530, 333; 239/289
See application file for complete search history.

(56) References Cited

U.S. PATENT DOCUMENTS

| | | | |
|---|---|---|---|
| 1,537,399 A * | 5/1925 | Wiswell | B65D 47/263 222/536 |
| 3,651,832 A * | 3/1972 | Meyer | B67D 7/002 248/590 |
| 3,901,449 A * | 8/1975 | Bochmann | B05B 9/0861 239/587.2 |
| 3,904,116 A * | 9/1975 | Jones | B05B 9/0866 239/332 |
| 4,022,350 A * | 5/1977 | Amron | F41B 9/0031 222/79 |
| 4,202,372 A * | 5/1980 | Gibbons | F16L 39/04 248/277.1 |
| 4,269,329 A * | 5/1981 | Keller | A01G 25/145 222/470 |
| 4,621,770 A * | 11/1986 | Sayen | A01G 25/145 239/444 |
| 4,700,892 A * | 10/1987 | Cunning | B05B 11/1095 239/487 |
| 4,787,560 A * | 11/1988 | DeYoreo | B05B 9/0816 239/374 |
| 4,925,105 A * | 5/1990 | Lin | B05B 9/0861 239/154 |
| 5,277,343 A * | 1/1994 | Parsonage | B65D 25/50 222/548 |
| 5,315,787 A * | 5/1994 | Schleicher | A01G 27/003 47/79 |
| 5,671,868 A * | 9/1997 | Herr | B65D 25/50 222/536 |
| 6,243,976 B1 * | 6/2001 | Beverly | D06F 75/14 38/77.5 |
| 6,425,149 B1 * | 7/2002 | Wang | E03C 1/0404 285/8 |
| 6,644,564 B2 * | 11/2003 | Perkitny | B05B 9/0861 239/332 |
| 7,325,579 B2 * | 2/2008 | Harding | A01G 25/145 141/2 |

(Continued)

*Primary Examiner* — Paul R Durand
*Assistant Examiner* — Michael J. Melaragno
(74) *Attorney, Agent, or Firm* — UB Greensfelder LLP; Brian E. Turung (57) ABSTRACT

A plant watering container that includes a container body, a liquid pump system and an extendable and retractable dispensing arm system.

11 Claims, 4 Drawing Sheets

(56) References Cited

U.S. PATENT DOCUMENTS

| | | | | |
|---|---|---|---|---|
| 7,513,394 | B2* | 4/2009 | Bone | B65D 47/248 |
| | | | | 222/481.5 |
| 7,841,132 | B1* | 11/2010 | Kinnear | A01G 25/145 |
| | | | | 47/48.5 |
| 8,091,744 | B2* | 1/2012 | Zwahlen | B65D 47/248 |
| | | | | 222/534 |
| 8,833,617 | B1* | 9/2014 | Compton | B65D 47/065 |
| | | | | 222/536 |
| 9,133,015 | B2* | 9/2015 | Taylor | B67D 1/0857 |
| 9,624,010 | B2* | 4/2017 | Harper | B65D 47/242 |
| 2004/0118940 | A1* | 6/2004 | Lavitt | B05B 9/0861 |
| | | | | 239/302 |
| 2005/0051231 | A1* | 3/2005 | Harding | A01G 25/145 |
| | | | | 141/2 |
| 2005/0127211 | A1* | 6/2005 | Yeiser | B05B 15/628 |
| | | | | 239/436 |
| 2007/0131790 | A1* | 6/2007 | Wu | A01G 25/145 |
| | | | | 239/525 |
| 2009/0242671 | A1* | 10/2009 | Erickson | E03C 1/0404 |
| | | | | 403/54 |
| 2010/0308083 | A1* | 12/2010 | Taylor | F04D 13/086 |
| | | | | 222/333 |
| 2011/0042487 | A1* | 2/2011 | Cai | B05B 14/00 |
| | | | | 222/401 |
| 2011/0315788 | A1* | 12/2011 | Henderson | A01B 76/00 |
| | | | | 239/152 |
| 2023/0172125 | A1* | 6/2023 | Taylor | A01G 25/145 |
| | | | | 47/48.5 |

* cited by examiner

FIG. 4

PLANT WATERING CONTAINER

The present application claims priority on U.S. Provisional Application Ser. No. 63/286,867 filed Dec. 7, 2021, which is incorporated herein by reference.

The present disclosure is directed to a watering container, and more particularly to a watering container that includes a liquid pump to facilitate in the operation of the watering container and an extension arm to facilitate in water plants and other items at an elevated height.

BACKGROUND OF THE DISCLOSURE

Hanging plants and plants located in elevated locations can be difficult to water. Generally a stool or ladder is required, which can be difficult to use for certain individuals. Also, watering containers that are filled with water can be difficult to tip when watering.

In view of the current state of the art of plant watering containers, there is a need for a plant watering container that is easy to use and can be used to easily water plants located in elevated locations.

SUMMARY OF THE DISCLOSURE

The present disclosure is directed to a plant water container that includes a liquid pump mechanism that is configured to conveniently dispense liquids from the plant watering container.

In one non-limiting aspect of the present disclosure, the plant water container of the present disclosure can be easily and conveniently used by consumers to dispense water from medium to large watering containers (e.g., pint container; quart container; liter container; half gallon container; two liter container; gallon container; two gallon container; five gallon container; 10 gallon container, etc.).

In another and/or alterative non-limiting aspect of the present disclosure, there is provided a plant water container that includes a liquid pump system that includes a top portion and a bottom portion. The liquid pump system can optionally include an elongated body; however, this is not required. The material and/or colors of the components of the liquid pump system are non-limiting. Generally, the materials are durable, water resistant, and light weight. Non-limiting materials that can be used include plastic, rubber, metal, resinous material, composite material, etc. The size and shape of the components of the liquid pump system are non-limiting. In one non-limiting embodiment, the liquid pump system includes many of the components of the liquid pump disclosed in U.S. Pat. No. 9,133,015; which is fully incorporated herein by reference. In another non-limiting embodiment, the general operation of the liquid pump is the same or similar to the liquid pump disclosed in U.S. Pat. No. 9,133,015.

In another and/or alternative non-limiting aspect of the present disclosure, the plant watering container includes one or more dispenser activators such as, but not limited to, dispensing tabs, knobs and/or buttons. The one or more dispenser activators can be used to activate the liquid pump and cause fluid in a container to be dispensed from the plant watering container. The one or more dispenser activators can be pivotable, rotatable, depressible, contact activated, etc.; however, it can be appreciated that the activation by the one or more dispenser activators can be accomplished by other or additional means (e.g., IR sensor, RF sensor, voice activation, remote control, light sensor, motion sensor, pressure sensor, touch sensor, etc.). The activation of the one or more dispenser activators causes a) the liquid pump to energize one or more components in the liquid pump to enable the liquid pump to pump fluid at least partially through the liquid pump, and/or b) to deactivate the liquid pump.

In another and/or alternative non-limiting aspect of the present disclosure, the top portion of the plant watering container can optionally include one or more visual indicators used to inform a user 1) when the liquid pump is activated and/or deactivated, 2) battery power level, 3) pump malfunction, and/or 4) liquid level in plant watering container. The visual indicator, when used, can be printed material (e.g., on, off, etc.) a light (e.g., green light indicates on, red light indicates off, LED display, LCD display, etc.), and/or a tactile indicator (e.g., raised ribs, etc.). The one or more visual indicators can be located on any portion of the plant watering container.

In another and/or alternative non-limiting aspect of the present disclosure, the top portion of the plant watering container includes a dispenser arm that can be raised and lowered. The size and shape of the dispenser arm is non-limiting. The dispenser arm can include two arm components; however, it can be appreciated that the dispenser arm can only have one arm component or more than two components. The dispenser arm when position in the extended position, can be used to a) dispense water from the plant watering container at an elevation above the top of the body of the plant watering container so that the user does not need to tip the plant watering container when watering a plant, and/or b) dispense water from the plant watering container at a location at a height at or slightly above the body of the plant watering container without the need of a ladder, stool, or the like.

In another and/or alternative non-limiting aspect of the present disclosure, the dispenser arm is configured to be collapsible and expandable. In non-limiting embodiment, the dispenser arm is formed of two or more arm sections that are rotatably or pivotally connected to one another. The one or more arm sections can include cavities and/or tubing to enable fluid to flow through the one or more arm sections.

In another and/or alternative non-limiting aspect of the present disclosure, the dispenser arm is configured to be lockable and/or unlockable. In one non-limiting arrangement, at least one portion of the dispenser arm (e.g., first arm section, etc.) is rotatably or pivotally connected to the body of the plant watering container, and such portion and/or body of the plant watering container includes a lock mechanism that is configured to maintain a portion of the dispenser arm in a certain position (e.g., fully collapsed or retracted position, fully extended position, one or more positions that are intermediate to the fully retracted and fully extended positions, etc.). The lock mechanism can include one or more tabs, knobs, switches, and/or buttons to enable a user to cause the lock mechanism to lock and/or unlock one or more portions of the dispenser arm.

In another and/or alternative non-limiting aspect of the present disclosure, the plant watering container can include one or more power sources. The one or more power sources generally include one or more batteries and/or solar cells; however, it can be appreciated that other or additional power sources can be used (e.g., electric plug, hand crank generator, etc.). In one non-limiting design, one or more batteries are fully or partially positioned in the plant watering container. In such a design, the plant watering container can optionally include a movable and/or removable battery cover on the plant watering container to enable a user to access the battery cavity. As can also be appreciated, the type of batteries is non-limiting (e.g., A, AA, AAA, C, D, 9V, lantern battery, watch battery, calculator battery, etc.). One or more surfaces of the battery cover can optionally include one or more ribs or other type of gripping structures to facilitate in the moving of the battery cover on the body so that a user can access the battery cavity; however, this is not required. A locking arrangement can optionally be used in association with the battery cover to lock/unlock the battery cover to the body of the top portion; however, this is not required. In one non-limiting arrangement, a battery cavity is included in the handle of the plant watering container. The battery cavity is configured to hold one or more batteries. The end portion or side of the handle can include a cap or panel that is movable and/or removable to enable the one or more batteries to be inserted into and/or removed from the battery cavity.

In another and/or alternative non-limiting aspect of the present disclosure, the liquid pump system of the plant watering container can include a bottom portion that is configured to be inserted through an opening in a container body of the plant watering container and be partially or fully submerged in a liquid in the container body. The bottom portion shape, size and materials are non-limiting. Generally, the bottom portion is formed of a lightweight, durable water-resistant material (e.g., plastic, rubber, composite material, metal, etc.). The bottom portion is configured to be positioned at the bottom of the container body or close to the bottom of the container body when the liquid pump system is connected to the container body; however, this is not required. In one non-limiting embodiment, the bottom portion has a longitudinal length of at least about 0.25 inches and generally 0.25-20 inches (and all values and ranges therebetween). The longitudinal length of the bottom portion is generally equal to or less than the longitudinal length of the elongated body; however, this is not required. In one non-limiting design, the ratio of the longitudinal length of the bottom portion to the longitudinal length of the elongated body is about 0.05:1 to 1:1 (and all values and ranges therebetween). The cross-section size and shape of the bottom portion is also non-limiting; however, the size and shape should be selected so that the bottom portion can be inserted into a container opening with which the liquid pump is to be used. In another and/or alternative non-limiting embodiment, the bottom portion has a generally circular cross-sectional shape and has a maximum diameter of about 0.1-3 inches (and all values and ranges therebetween). The maximum cross-sectional area of the bottom portion can be greater, equal to, or less than the maximum cross-sectional area of elongated body. In one non-limiting design, the ratio of the maximum cross-sectional area of the bottom portion to the maximum cross-sectional area of elongated body is about 0.5:1 to 3:1 (and all values and ranges therebetween. In still another and/or alternative non-limiting embodiment, the bottom portion has a weight and density that is generally selected so that the bottom portion will sink in water; however, this is not required. In yet another and/or alternative non-limiting one embodiment, the bottom portion has one or more openings configured to enable fluid in a container to be drawn to the interior of the bottom portion. The location, shape and size of the one or more openings on the bottom portion is non-limiting. In one non-limiting design, the bottom portion includes at least one opening at the bottom end of the bottom portion. One of the openings can be centrally located in the bottom end; however, this is not required. The one or more openings can be circular; however, it can be appreciated that the one or more openings can have cross-sectional shapes other than a circular shape.

As can also be appreciated, the one or more openings can be positioned on other or additional locations on the bottom portion (e.g., one or more openings can be positioned on the side of the bottom portion, etc.).

In another and/or alternative non-limiting aspect of the present disclosure, the liquid pump system of the plant watering container optionally includes one or more electric motors. The one or more electric motors are configured to 1) draw fluid into the bottom portion, 2) cause fluid to travel up through the elongated body, 3) cause fluid to flow to the top portion and out of one or more dispenser heads on the plant watering container (e.g., into and out of a portion of the dispenser arm, etc.). In one non-limiting embodiment of the disclosure, the one or more electric motors can be partially or fully located in the top portion, the elongated body, and/or the bottom portion of the liquid pump system. In one non-limiting design, the one or more motors are partially or fully positioned in the elongated body and/or bottom portion. In another and/or alternative non-limiting design, the one or more motors are fully positioned in the bottom portion. In still another and/or alternative non-limiting design, the liquid pump system includes a single motor that is partially or fully positioned in the elongated body and/or bottom portion. In yet another and/or alternative non-limiting design, the liquid pump system includes a single motor that is fully positioned in the bottom portion of the liquid pump. The one or more motors generally include one or more blades that are rotated by the electric motor so as to cause fluid to flow through the liquid pump system; however, this is not required. As can be appreciated, the electric motors can be used to also or alternatively power one or more pistons that cause fluid to flow through the liquid pump system. In another and/or alternative non-limiting design, one or more chambers located in the top portion, the elongated body, and/or the bottom portion are configured to fully or partially contain the one or more motors.

In another and/or alternative non-limiting aspect of the present disclosure, the liquid pump system of the plant watering container includes an elongated body connected between the top portion and the bottom portion of the liquid pump; however, this is not required. The elongated body, when used, includes one or more channels along the longitudinal length of the elongated body so that fluid can flow from the bottom portion, through the elongated body, and to the top portion of the liquid pump system. The elongated body can be a separate component or be integrally formed with the top portion and/or the bottom portion. The length, shape, cross-section shape, color and/or materials of the elongated body is non-limiting. The elongated body can be partially or fully formed of a flexible material (e.g., plastic, rubber, composite material, metal, etc.); however, this is not required. In one non-limiting embodiment, the elongated body is a separate component from the top portion and/or the bottom portion of the liquid pump system. The elongated body can be configured to be permanently or detachably connected to the top portion and/or the bottom portion of the liquid pump system. When the elongated body is connected to the bottom portion, the elongated body is fluidly connected to one or more openings in the bottom portion. Generally, the bottom portion includes one or more openings in the top of the bottom portion that allows fluid to flow out of the bottom portion after the fluid has been drawn into the bottom portion; however, it can be appreciated that one or more openings can be positioned on other or additional regions of the bottom portion. In one non-limiting design, the bottom portion includes a single top opening and a bottom portion of the elongated body that is configured to be connected to the top opening (e.g., positioned into the opening in the bottom portion, fitted about the opening in the bottom portion, etc.). In another and/or alternative one non-limiting embodiment, the elongated body has a generally cylindrical shape; however, the elongated body can have other or additional shapes. The cross-section shape and size of the elongated body can be generally uniform along the longitudinal length of the elongated body; however, it can be appreciated that the cross-section shape and/or size of the elongated body can vary along the longitudinal length of the elongated body. The length of the elongated body is non-limiting. In one non-limiting design, the elongated body has a length of about 1-25 inches (and all values and ranges therebetween). The cross-section size of the elongated body is also non-limiting. In one non-limiting design, when the elongated body has a circular cross-section shape, the diameter is about 0.1-3 inches (and all values and ranges therebetween). In still another and/or alternative one non-limiting embodiment, one or more portions of the elongated body can be configured to be flexible and/or be formed of a flexible material; however, this is not required. When the elongated body is configured to be partially or fully flexible, such a design allows the elongated body to be more conveniently positioned in different shaped and/or sized containers. In one non-limiting design, the elongated body is formed of a flexible tubular material. The tubular material can be clear, partially clear, or colored to prevent viewing of the interior of the elongated body. In still yet another and/or alternative one non-limiting embodiment, one or more electric wires can partially or fully extend through the elongated body; however, this is not required. For example, when one or more electric motors are located in the elongated body and/or the bottom portion, and the power supply is located in the top portion, elongated body and/or the bottom portion, one or more electric wires are required to be within the elongated body and/or along the outside of the elongated body. In one non-limiting design, when the power supply for the one or more electric motors is separated from the one or more electric motors that are partially or fully positioned in the elongated body and/or bottom portion the liquid pump, one or more electric wires are positioned in one or more portions of the interior of the elongated body so as to electrically connect one or more electric motors to the power supply. When one or more electric wires are positioned in one or more portions of the interior of the elongated body, the one or more electric wires can be isolated from fluid that flows through one or more passageways in the interior of the elongated position that are used to allow fluid to flow through the elongated body; however, this is not required.

One non-limiting object of the present disclosure is the provision of a plant watering container that can be used to enable convenient dispensing of fluid from the container body of the plant watering container without having to lift and then pour a liquid from the container body.

Another and/or alternative non-limiting object of the present disclosure is the provision of a plant watering container that includes a liquid pump system that includes a motor in the base portion to pump fluid upwardly through an elongated body and to the top portion of the liquid pump system and then out of one or more openings in the dispenser arm.

Another and/or alternative non-limiting object of the present disclosure is the provision of a plant watering container that includes an extendable and retractable dispenser arm to facilitate in water plants or dispensing a fluid at locations above the container body of the plant watering container.

Another and/or alternative non-limiting object of the present disclosure is the provision of a plant watering container that includes a container body, a top body, a liquid pump system, a dispenser activator, and an extendable and retractable dispensing arm system. The top body is connectable to the container body. The liquid pump system and the extendable and retractable dispensing arm system are connectable to the top body. The liquid pump system is configured to cause liquid to flow from a cavity of the container body to the extendable and retractable dispensing arm system and out a nozzle or opening in the extendable and retractable dispensing arm system when the liquid pump system is activated. The liquid pump system can include a top portion, a bottom portion, and an electric motor. The top portion of the liquid pump system is at least partially connected to and/or positioned in the top body. The bottom portion is fluidly connected or interconnected to the top portion of the liquid pump system. The dispenser activator is configured to activate the liquid pump system. The extendable and retractable dispensing arm system is configured to be movable relative to the top body to enable a user to adjustably position the nozzle or opening in the extendable and retractable dispensing arm system relative to the top body.

Another and/or alternative non-limiting object of the present disclosure is the provision of a plant watering container that further includes a handle that is connected to the top body. The handle can include a power cavity that is configured to receive a power source used to power the electric motor of the liquid pump system. The handle can include a movable or removable cap or panel that is configured to cover an access opening of the power cavity when the movable or removable cap or panel is connected to a body of the handle.

Another and/or alternative non-limiting object of the present disclosure is the provision of a plant watering container wherein the dispenser activator is connected to the handle.

Another and/or alternative non-limiting object of the present disclosure is the provision of a plant watering container that wherein the dispenser activator is biased in a deactivation position.

Another and/or alternative non-limiting object of the present disclosure is the provision of a plant watering container that wherein the top body includes a cavity and a fluid passageway. The cavity can at least partially include the liquid pump system. The fluid passageway is configured to enable fluid to flow fully through the top body via the fluid passageway. The fluid passageway can be isolated from the cavity so as to inhibit or prevent fluid flow into the cavity when fluid flows through the fluid passageway.

Another and/or alternative non-limiting object of the present disclosure is the provision of a plant watering container that further includes a rotatable lid that is rotatably connected to the top body. The rotatable lid can include a lid opening. The rotatable lid can be configured to rotate relative to the top body such that the lid opening in the rotatable lid can be aligned and unaligned with the fluid passageway of the top body.

Another and/or alternative non-limiting object of the present disclosure is the provision of a plant watering container wherein the rotatable lid can include a recessed portion that is positioned adjacent to the lid opening. The recessed portion can be configured to cause fluid in the recessed portion to flow toward and into the lid opening.

Another and/or alternative non-limiting object of the present disclosure is the provision of a plant watering container wherein the extendable and retractable dispensing arm system includes first and second arms. The first arm can be movably connected to the top body. The first and second arms can be movably connected together. The second arm can include a spray nozzle or opening. The first and second arms are movable between extended and retracted positions.

Another and/or alternative non-limiting object of the present disclosure is the provision of a plant watering container wherein the first and second arms of the extendable and retractable dispensing arm system can be configured to position the spray nozzle or opening above a top of the top body when the first and second arms are in one or more of the extended positions.

Another and/or alternative non-limiting object of the present disclosure is the provision of a plant watering container wherein a portion of the second arm is positionable below an arm mount on the top body when the extendable and retractable dispensing arm system is in the retracted position.

A method for watering a plant comprising a) providing a plant watering container as discussed above, b); said plant watering container that includes a container body, a top body, a liquid pump system at least partially filling the container body of the plant watering container with a liquid, c) moving the extendable and retractable dispensing arm system of the plant watering system from a retracted position to an extended position such that at least portion of the extendable and retractable dispensing arm system is located at a height above a top surface of the top body of the plant watering system; and, d) causing the dispenser activator of the plant watering system to activate the liquid pump system of the plant watering system to cause the fluid in the container body to be dispensed from the extendable and retractable dispensing arm system at a location above the top surface of the top body.

These and other objects and advantages will become apparent from the following description taken together with the accompanying drawings.

BRIEF DESCRIPTION OF THE DRAWINGS

Reference may now be made to the drawings, which illustrate several non-limiting embodiments that the disclosure may take in physical form and in certain parts and arrangements of parts wherein.

DETAILED DESCRIPTION OF A NON-LIMITING EMBODIMENT

Referring now to the drawings wherein the showings are for the purpose of illustrating non-limiting embodiments of the disclosure only and not for the purpose of limiting same, FIGS. 1-4 illustrate one non-limiting embodiment of the plant watering container in accordance with the present disclosure.

The plant watering container 100 includes a container body 200, a liquid pump system 900 and an extendable and retractable dispensing arm system 600. The materials used to form the plant watering container 100 is non-limiting.

The container body 200 is configured to have a cavity to hold a liquid such as water, water mixed with plant food, nutrients, insecticide, fungicide, and/or other chemicals. The size of the container body is non-limiting. The material used to form the container body can be transparent or semi-transparent to enable a user to see the liquid level in the container body; however, this is not required.

The container body 200 is illustrated as having a flat bottom 210. The bottom portion of the container body can include an optional taper.

Figure 1:
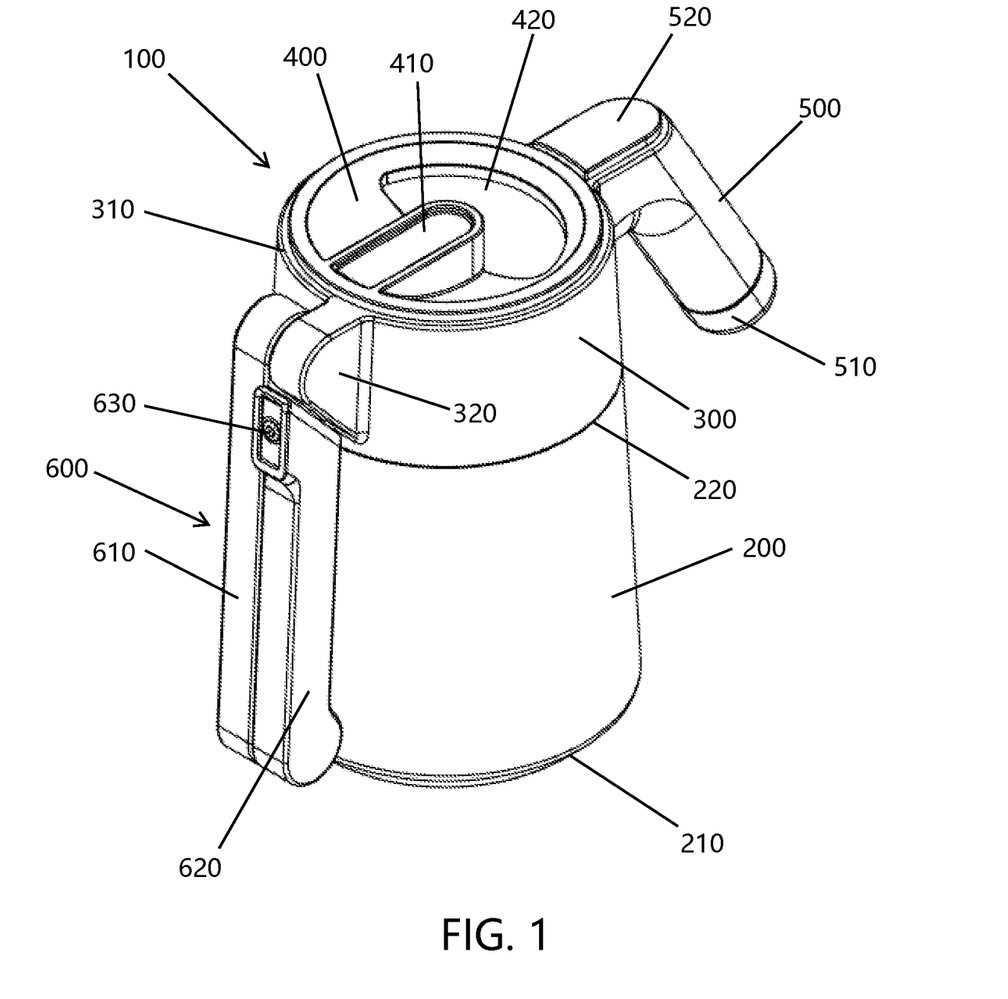
FIG. 1 is a side elevation view of one non-limiting plant watering container of the present disclosure wherein the dispenser arm is in the retracted, stored position.
Figure 4:
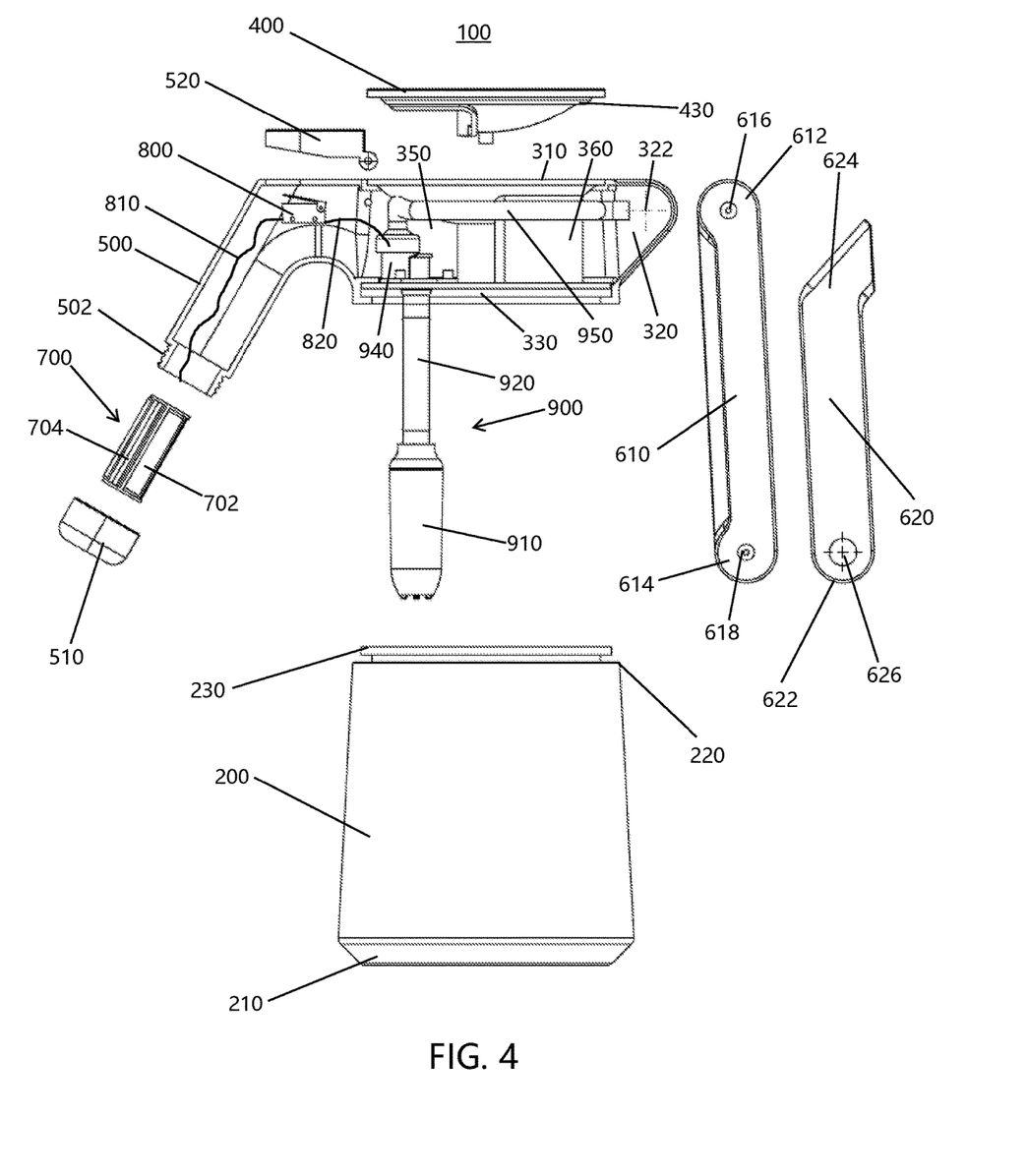
FIG. 4 is an exploded view of the plant watering container of FIG. 1.

The cross-sectional shape of the container body 200 and the cavity of the container body is non-limiting. As illustrated in FIG. 1, the container body 200 has a generally circular cross-sectional shape along the central axis of the container body 200; however, it will be appreciated that other shapes can be used. The cross-sectional area along the central axis of the container body 200 can be constant or variable. As illustrated in FIG. 4, the cross-sectional area along the central axis of the container body 200 slightly decreases from the bottom to the top of the container body 200. The top portion 220 of the container body can optionally include threading or connection rim 230 that is used to facilitate in connecting the top body 300 to the top of the container body 200.

The top body 300 includes a cavity 350 that includes all or portion of the top portion 940 of the liquid pump system 900 that is used to facilitate in enabling fluid flow between the liquid pump system 900 and the dispensing arm system 600. The liquid pump system can include tubing and/or channels 950. The liquid pump system 900 can optionally include a one-way valve that is used inhibit or prevent the backflow of fluid back into the cavity of the container body 200. As illustrated in FIG. 4, some or all of the tubing and/or channels 950 of the liquid pump system 900 can be located in the cavity of the top body 300. Likewise, if a one-way valve is used, the one-way valve can optionally be located in the cavity of the top body 300.

As illustrated in FIG. 4, the height of the top body 300 is generally less (e.g., 2+ times less) that the height of the container body 200.

The bottom portion of the top body 300 can optionally include threading or a connection rim 330 that is used to facilitate in connecting the top body 300 to the top of the container body 200. The threading or a connection rim 330 can be optionally configured to releasably connect to the threading or connection rim 230.

The top of the top body 300 can optionally include an opening and a passageway 360 wherein liquid can be poured into the top opening and the opening and passageway 360 allows the fluid to flow through the top body 300 and into the cavity of the container body while the top body 300 is connected to the container body 200. The shape and size of the opening and passageway 360 are non-limiting. The passageway 360 is generally configured to be isolated from the cavity 350 of the top body 300 so that when liquid lows through the passageway 360, the liquid does not enter the cavity 350.

The top body can include an arm mount 320 that is used to connect the retractable/extendable dispensing arm system 600 to the top body. The arm mount 320 is generally rigidly connected to the top body 300.

A lid 400 can be configured to be connected to the top of the top body 300. The lid can include a groove 430 that enables the lid 400 to be rotatably connected to the top of the top body 300 (e.g., rotating the lid on the top body 300; twisting off or rotating the lid to connect/remove the lid 400 to/from the top body 300, etc.). The lid 400 may or may not be configured to be releasably connected to the top body 300. The lid 400 includes an opening 420 that allows liquid to be poured through opening 420 and through passageway 360 when the lid 400 is connected to the top body 300. While the lid 400 is connected to the top body 300 and the opening 420 is partially or fully oriented with passageway 360 of the top body 300, the opening 420 allows liquid to flow through the opening 420, into and through the passageway 360 of the top body 300 and then into the container body 200 while the top body 300 is connected to the container body 200. The shape of opening 420 can have the same or similar configuration to the top of passageway 360; however, this is not required. The lid 400 can be configured to be rotatable by a user to move the opening 420 so that most or all of the opening is not over the passageway so that the lid 400 partially or fully covers the passageway 360 to thereby inhibit or prevent liquid in the cavity of the container body from spilling out of the container body via passageway 360 in the top body 300. As illustrated in FIGS. 1-4, the lip 400 has a generally circular shape.

Figure 2:
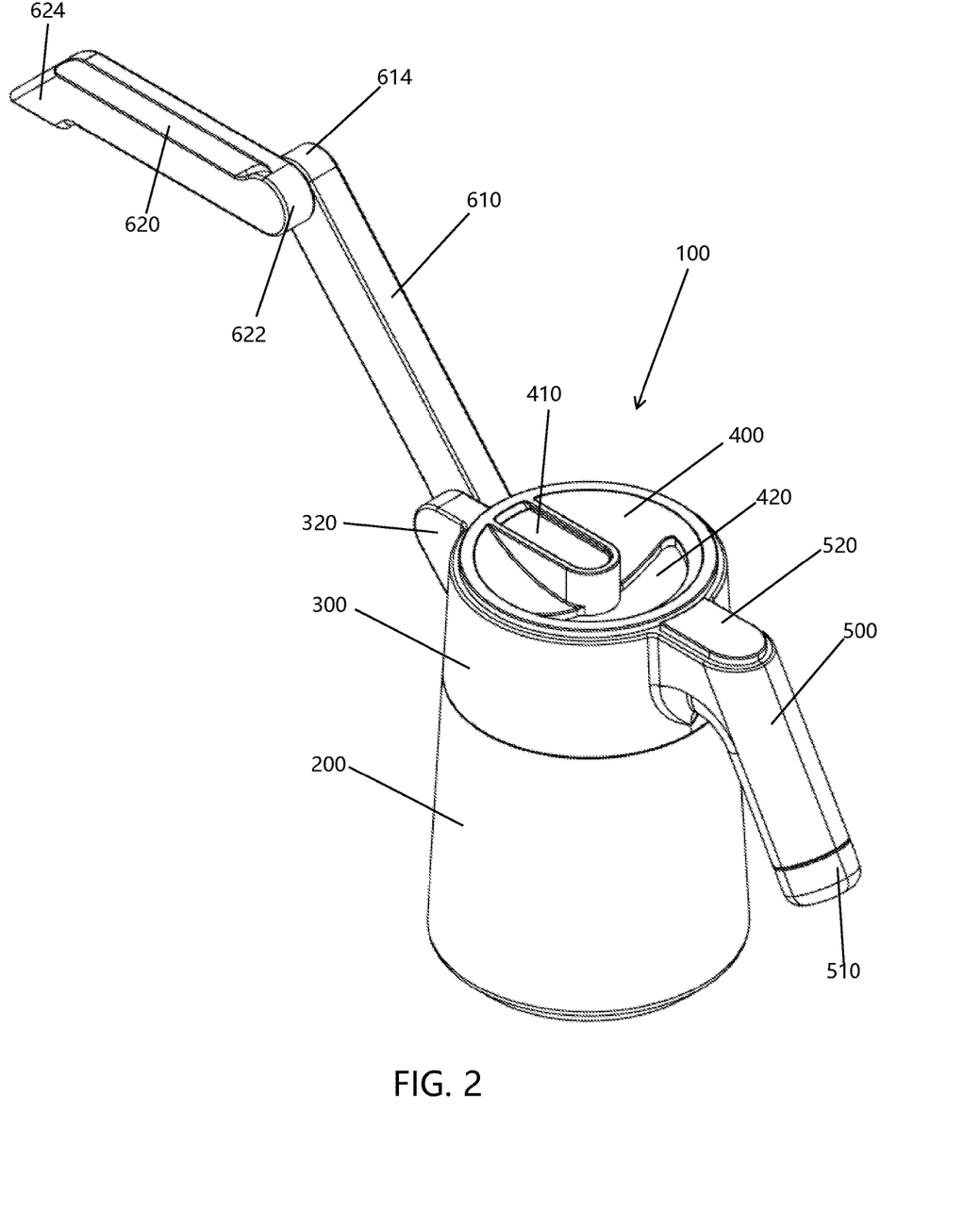
FIG. 2 is a side elevation view of the plant watering container of FIG. 1 wherein the dispenser arm in the raised, extended position.
Figure 3:
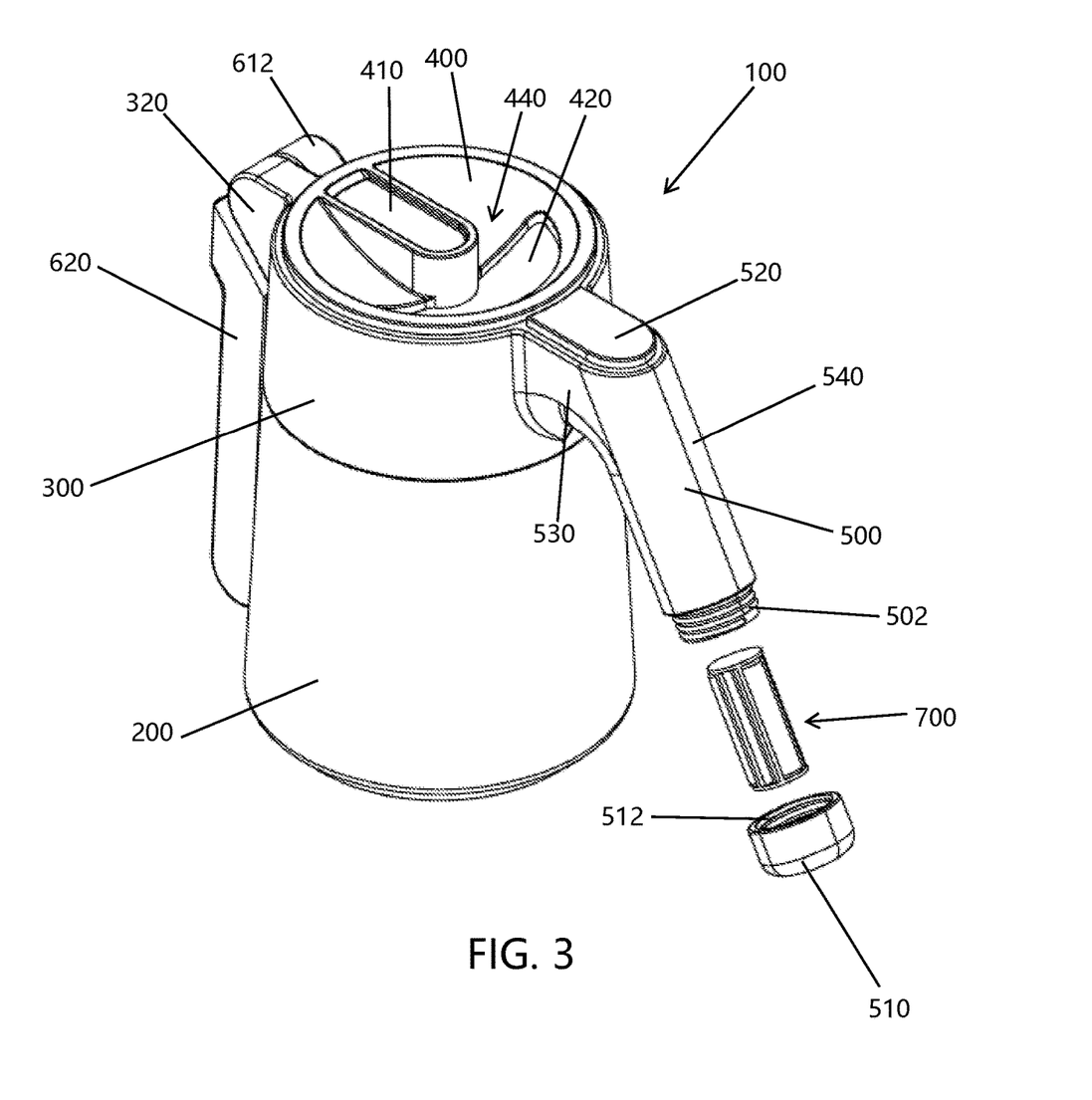
FIG. 3 a side elevation view of one non-limiting plant watering container of the present disclosure wherein the dispenser arm is in the retracted, stored position and the cap of the battery compartment is removed.

The top of the lid 400 can optionally include a grasp tap 410 the is used to facilitate in grasping the lid and/or turning the lid so as to rotate the lid 400 relative to the top body 300, and/or to connect and/or disconnect the lid 400 from the top of the top body 300. As illustrated in FIGS. 1-3, the top center region of the lid 400 can form a recessed portion 440 that creates a well-like structure in the lid 400 that directs liquid that spills on the top surface of the lid 400 to the opening 420 in the lid 400. The shape of the recess portion 440 is non-limiting. The location of the grasp tab 410 can be such that when it is positioned for aligned with the arm mount 320, the opening 420 of the lid 400 is positioned over the passageway 360 in the top body 300; however, this is not required. Likewise, when lid 400 is rotated such that opening 420 is aligned with the arm mount 320, the lid 400 covers the passageway 360 in the top body 300. These visual indicators can be used by the user to facilitate in the use of the plant watering container 100.

The handle 500 that is connected (e.g., rigidly connected, etc.) to the top body 300 and/or the top body 300 can partially or fully include the activation button 520 and/or activation switch 800. The shape of the top body is non-limiting. The activation button 520 can be configured to be depressible. The activation button 520 can be configured to move and/or pivot between an activation and deactivation position. When the activation bottom is depressed, the switch 800 is caused to be activated, which in turn activates the motor of the liquid pump system 900. The switch 800 and/or the activation button 520 can be spring biased to cause the activation button move to the deactivation position when the user removes pressure on the activation button 520.

As illustrated in FIG. 4, a portion of the handle 500 can include a cavity that is configured to receive the power source 700. A cap 510 can be configured to releasably connect to the end of the handle 500. The cap 510 can be used to seal the power source 700 in the cavity of the handle 500. The cap 510 can optionally include threading 512 that can be threaded to threading 502 on the handle 500.

The handle 500 is illustrated as extending downwardly and at an angle from the top body 300. The downward angle is generally 20-70° (and all values and ranges therebetween, 30-50°, etc.). The handle 500 includes a front portion 530 that outwardly from the top portion 300 and a rear portion 540 that angles downwardly from the front portion. Generally, the longitudinal length of the front portion 530 is less than the longitudinal length of the rear portion 540. As illustrated in FIGS. 1-4, the rear portion 540 has a generally circular cross-sectional shape; however, other shapes can be used.

The power source 700 can optionally include a battery cartridge 740 that is configured to holder one or more batteries 702. As can be appreciated, the battery cartridge can be eliminated and the battery can be insertable into the cavity of the handle.

One or more electrical wires 810 can optionally be used to electrically connect the power source to switch 800, and one or more electric wires 820 can optionally be used to electrically connect the switch 800 to the liquid pump system 900.

The liquid pump system 900 includes a lower portion 910 that generally includes a pump motor; however, this is not require. Connected between the top portion 940 and the lower portion 910 is an intermediate portion 920. The top portion 940 is connected to the top body 300. The top portion 940 can be fully or partially contained in the cavity 350 of the top body 300. A portion of the intermediate portion 920 can optionally be connected to the top body 300; however, this is not required. As illustrated in FIG. 4, the top portion 940 of the liquid pump system 900 is connected to the top body 300 at a location that is rearward of the central axis of the top body 300 and at a location that is closer to the handle 500 than to the arm mount 320 on the top body 300. As also illustrated in FIG. 4, the top portion 940 of the liquid pump system 900 is connected to the top body 300 at a location that is rearward of the passageway 360 in the top body 300. As illustrated in FIG. 4, the handle 500 is connected to the top body 300 and a location that is generally opposite from the arm mount 320.

When the liquid pump system 900 is activated, the pump motor causes fluid in the cavity of the container body 200 to be drawn into the lower portion 910 and then the liquid is caused to flow through the intermediate portion 920, to the top portion 940 and then into tubing 950 and then to the dispensing arm system 600.

The retractable/extendable dispensing arm system 600 is configured to enable a user to dispense liquid from the container body 200 at a height that is above the top edge 220 of the container body and/or above the top of the top body 300. The retractable/extendable dispensing arm system 600 can be configured to be manually expanded/retracted and/or be expanded/retracted be use of a motor. The size, length and/or shape of the retractable/extendable dispensing arm system 600 is non-limiting.

When the retractable/extendable dispensing arm system 600 is in the retracted position as illustrated in FIG. 1, the retractable/extendable dispensing arm system 600 can be optionally design to inhibit or prevent fluid flow through the retractable/extendable dispensing arm system even when the liquid pump system 900 is activated; however, this is not required.

The opening or spray nozzle 630 in the retractable/extendable dispensing arm system 600 can be optionally be configured to be adjustable to adjust the spray pattern and/or to control fluid volume flow through the retractable/extendable dispensing arm system 600 when the liquid pump system 900 is activated. As illustrated in FIG. 1, the opening or spray nozzle 630 is positioned below the top body 300 when the retractable/extendable dispensing arm system 600 is in the retracted position. As can be appreciated, the retractable/extendable dispensing arm system 600 can be configured to enable a user to orient the first and second arms 610, 620 is many different positions, or can be configured such that the first and second arms 610, 620 can be moved to certain limited positions. Irrespective of the first and second arm 610, 620 configurations, the extended position of the first and second arms 610, 620 can have one or more different extended positions.

The retractable/extendable dispensing arm system 600 includes a first arm 610 and a second arm 620. The bottom end portion 612 of the first arm 610 includes a connection arrangement 616 (e.g., opening, pin, hinge, groove circular rib, etc.) that is configured to be moveably connected to connection arrangement 322 (e.g., opening, pin, hinge, groove circular rib, etc.) in the arm mount 320 on the top body 300. As illustrated in FIGS. 1-3, the first arm 610 is connected to one side of arm mount 320. The top end portion 614 includes a connection arrangement 618 (e.g., opening, pin, hinge, groove circular rib, etc.) that is configured to be moveably connected to a connection arrangement 626 (e.g., opening, pin, hinge, groove circular rib, etc.) in the bottom portion 622 of the second arm 620. The first arm 610 and the second arm are configured to be movably connected to one another so that the first and second arms can be moved between the extended position illustrated in FIG. 2 and the retracted position as illustrated in FIG. 1. The connection arrangements between the first and second arms 610, 620 can be such that the first and second arms can only move relative to one another in a single plane. Likewise, the first arm 610 can be connected to the arm mount 320 such that the first arm 610 can only move relative to the arm mount 320 in a single plane.

As illustrated in FIG. 4, the length of the first arm 610 is greater than the length of the second arm 620. As illustrated in FIG. 1, the second arm 620 is configured to be located beneath the arm mount 320 when the retractable/extendable dispensing arm system 600 is in the retract position. When the retractable/extendable dispensing arm system 600 is in the retract position, the retractable/extendable dispensing arm system 600 is positioned above the base of the container body 200.

The first and second arms 610, 620 can have the same cross-sectional shape and/or cross-sectional size along over 50% (e.g., 50-100% and all values and ranges therebetween) of the longitudinal length of the first and second arms 610, 620. As illustrated in FIGS. 1-4, the cross-sectional shape of the first and second arms 610, 620 along over 50% of the longitudinal length of the first and second arms 610, 620 is generally square or rectangular shaped; however, other shapes can be used.

The first and second arms 610, 620 enable a user to adjust the height and positioning of the spray nozzle 630 on the second arm 620 so that the user can easily and conveniently dispense liquid from the plant watering container 100. Generally, the first arm 610 can rotate 30-220° (and all values and ranges therebetween; 45-190°, etc.) relative to the arm mount 320. Generally, the second arm 620 can rotate 20-360° (and all values and ranges therebetween; 45-200°, etc.) relative to the first arm 610.

The opening or spray nozzle 630 on the top portion of the second arm 620 is illustrated in FIG. 1 to be recessed in the front face of the second arm 620; however, this is not required. The top portion 624 of the second arm 620 is illustrated as having an angle portion; however, this is not required. As illustrated in FIG. 1, the top of the angle portion of the second arm is flush with an angled portion of the arm mount. The angled portion of the top portion 624 has a longitudinal length that is less than (2-20 times less than and all values and ranges therebetween) the longitudinal length of the second arm 620. The angle of the angled portion is about 20-75° (and all values and ranges therebetween).

The liquid pump system 900 is configured to dispense fluid, not shown, from the container body 200 and out through the opening or spray nozzle 630 on the top portion of the second arm 620 of the retractable/extendable dispensing arm system 600.

The plant watering container 100 can optionally include a carrying strap (not shown) for ease of carrying the plant watering container 100.

These and other advantages will become apparent to those skilled in the art upon the reading and following of this description.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g., "about 2 to about 4" also discloses the range "from 2 to 4." Generally, the terms "about" and "approximately" may refer to plus or minus 10% of the indicated number.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall there between. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

To aid the Office and any readers of this application and any resulting patent in interpreting the claims appended hereto, Applicant does not intend any of the appended claims or claim elements to invoke 35 U.S.C. 112(f) unless the words "means for" or "step for" are explicitly used in the particular claim.

What is claimed:

1. A plant watering container that includes a container body, a top body, a liquid pump system, a dispenser activator, a handle, and an extendable and retractable dispensing arm system; said top body is connected to said container body; said liquid pump system and said extendable and retractable dispensing arm system are both connected to said top body; said liquid pump system is configured to cause liquid to flow from a cavity of said container body to said extendable and retractable dispensing arm system and out a nozzle or opening in said extendable and retractable dispensing arm system when said liquid pump system is activated; said liquid pump system includes a top portion, a bottom portion, and an electric motor; said top portion of said liquid pump system is at least partially connected to and/or positioned in said top body; said bottom portion is fluidly connected or interconnected to said top portion of said liquid pump system; said dispenser activator is configured to activate said liquid pump system; said extendable and retractable dispensing arm system is configured to be movable relative to said top body to enable a user to adjustably position said nozzle or opening in said extendable and retractable dispensing arm system relative to said top body; said retractable arm includes first and second arms; a first end of said first arm is pivotally connected to said top body; a second end of said first arm is pivotally connected to a first end of said second arm; a second end of said second arm includes said nozzle or opening; said first and second arms are movable between retracted and extended positions; said handle is connected to only one side of said top body; said handle includes a first portion that is connected to and outwardly extends from said top body, and a second portion that angles downwardly from said first portion of said handle; said second portion is detached from said top body; said handle includes a power cavity configured to receive a removable power source that is used to power said electric motor of said liquid pump system.

2. The plant watering container as defined in claim 1, wherein said handle includes a movable or removable cap or panel that is configured to cover an access opening of said power cavity when said movable or removable cap or panel is connected to a body of said handle so as to enable said removable power source to be removed from said power cavity.

3. The plant watering container as defined in claim 1, wherein said dispenser activator is connected to said handle.

4. The plant watering container as defined in claim 3, wherein said dispenser activator is biased in a deactivation position.

5. The plant watering container as defined in claim 1, wherein said top body includes a cavity, and a fluid passageway; said cavity at least partially includes said liquid pump system; said fluid passageway is configured to enable fluid to flow fully through said top body via said fluid passageway; said fluid passageway is isolated from said cavity so as to inhibit or prevent fluid flow into said cavity when fluid flows through said fluid passageway.

6. The plant watering container as defined in claim 5, further including a rotatable lid that is rotatably connected to said top body; said rotatable lid includes a lid opening; said rotatable lid is configured to be rotated relative to said top body such that said lid opening in said rotatable lid can rotate to a first position so as to aligned said lid opening with said fluid passageway of said top body to enable fluid to be inserted into said cavity of said container body, and to rotate to a second portion so as to unalign said lid opening with said fluid passageway of said top body to inhibit or prevent fluid to be inserted into said cavity of said container body.

7. The plant watering container as defined in claim 6, wherein said rotatable lid includes a recessed portion that is positioned adjacent to said lid opening; said recessed portion is configured to cause fluid in said recessed portion to flow toward and into said lid opening.

8. The plant watering container as defined in claim 1, wherein said extendable and retractable dispensing arm system has one or more properties selected from the group consisting of a) a length of said first arm is greater than a length of said second arm, b) both said first and second arms are positioned below a top edge of said top body when in said retracted position, c) said first and second arms can have a same cross-sectional shape and/or cross-sectional size along over 50% of a longitudinal length of said first and second arms, d) an end portion of said second arm has an angle portion, and wherein said angled portion has an angle of 20-75°, and e) a portion of said second arm is positionable below an arm mount on said top body when said second arm is in said retracted position, wherein said arm mount is opposite said handle.

9. The plant watering container as defined in claim 8, wherein said first and second arms of said extendable and retractable dispensing arm system are configured to position said spray nozzle or opening above a top of said top body when said first and second arms are in one or more said extended positions.

10. A plant watering container that includes a container body, a top body, a liquid pump system, a dispenser activator, a handle, and an extendable and retractable dispensing arm system; said top body connected to said container body; said liquid pump system and said extendable and retractable dispensing arm system connected to said top body; said liquid pump system configured to cause liquid to flow from a cavity of said container body to said extendable and retractable dispensing arm system and out a nozzle or opening in said extendable and retractable dispensing arm system when said liquid pump system is activated; said liquid pump system including a top portion, a bottom portion, and an electric motor; said top portion of said liquid pump system at least partially connected to and/or positioned in said top body; said bottom portion fluidly connected or interconnected to said top portion of said liquid pump system; said dispenser activator configured to activate said liquid pump system; said handle is connected to only one side of said top body; said handle includes a first portion that is connected to and outwardly extends from said top body, and a second portion that angles downwardly from said first portion of said handle; said extendable and retractable dispensing arm system configured to be movable relative to said top body to enable a user to adjustably position said nozzle or opening in said extendable and retractable dispensing arm system relative to said top body; said extendable and retractable dispensing arm system includes first and second arms each located outside said top body; said first arm is movably connected to an arm mount that is positioned on an exterior portion of said top body opposite said handle; said first and second arm are movably connected together; said second arm includes said spray nozzle or opening; said first and second arms movable between extended and retracted positions; a portion of said second arm is positionable below said arm mount when said extendable and retractable dispensing arm system is in said retracted position.

11. A method for watering a plant comprising:
providing a plant watering container; said plant watering container that includes a container body, a top body, a liquid pump system, a dispenser activator, a handle, and an extendable and retractable dispensing arm system; said top body is connected to said container body; said liquid pump system and said extendable and retractable dispensing arm system are both connected to said top body; said liquid pump system is configured to cause liquid to flow from a cavity of said container body to said extendable and retractable dispensing arm system and out a nozzle or opening in said extendable and retractable dispensing arm system when said liquid pump system is activated; said liquid pump system includes a top portion, a bottom portion, and an electric motor; said top portion of said liquid pump system is at least partially connected to and/or positioned in said top body; said bottom portion is fluidly connected or interconnected to said top portion of said liquid pump system; said dispenser activator is configured to activate said liquid pump system; said handle is connected to only one side of said top body; said handle includes a first portion that is connected to and outwardly extends from said top body, and a second portion that angles downwardly from said first portion of said handle; said extendable and retractable dispensing arm system is configured to be movable relative to said top body to enable a user to adjustably position said nozzle or opening in said extendable and retractable dispensing arm system relative to said top body; said retractable arm includes first and second arms each located outside side top body; a first end of said first arm is pivotally connected to an arm mount that is positioned on an exterior portion of said top body opposite said handle; a second end of said first arm is pivotally connected to a first end of said second arm; a second end of said second arm includes said nozzle or opening; said first and second arms are movable between retracted and extended positions;
at least partially filling said container body with a liquid;
moving said extendable and retractable dispensing arm system from a retracted position to an extended position such that at least portion of said extendable and retractable dispensing arm system is located at a height above a top surface of said top body; and,
causing said dispenser activator to activate said liquid pump system to cause said fluid in said container body to be dispensed from said extendable and retractable dispensing arm system at a location above said top surface of said top body.

* * * * *